May 13, 1941.                C. W. H. D. BENNET                2,241,975
                              ELASTIC FLUID ENGINE
                    Original Filed June 20, 1939    2 Sheets-Sheet 1
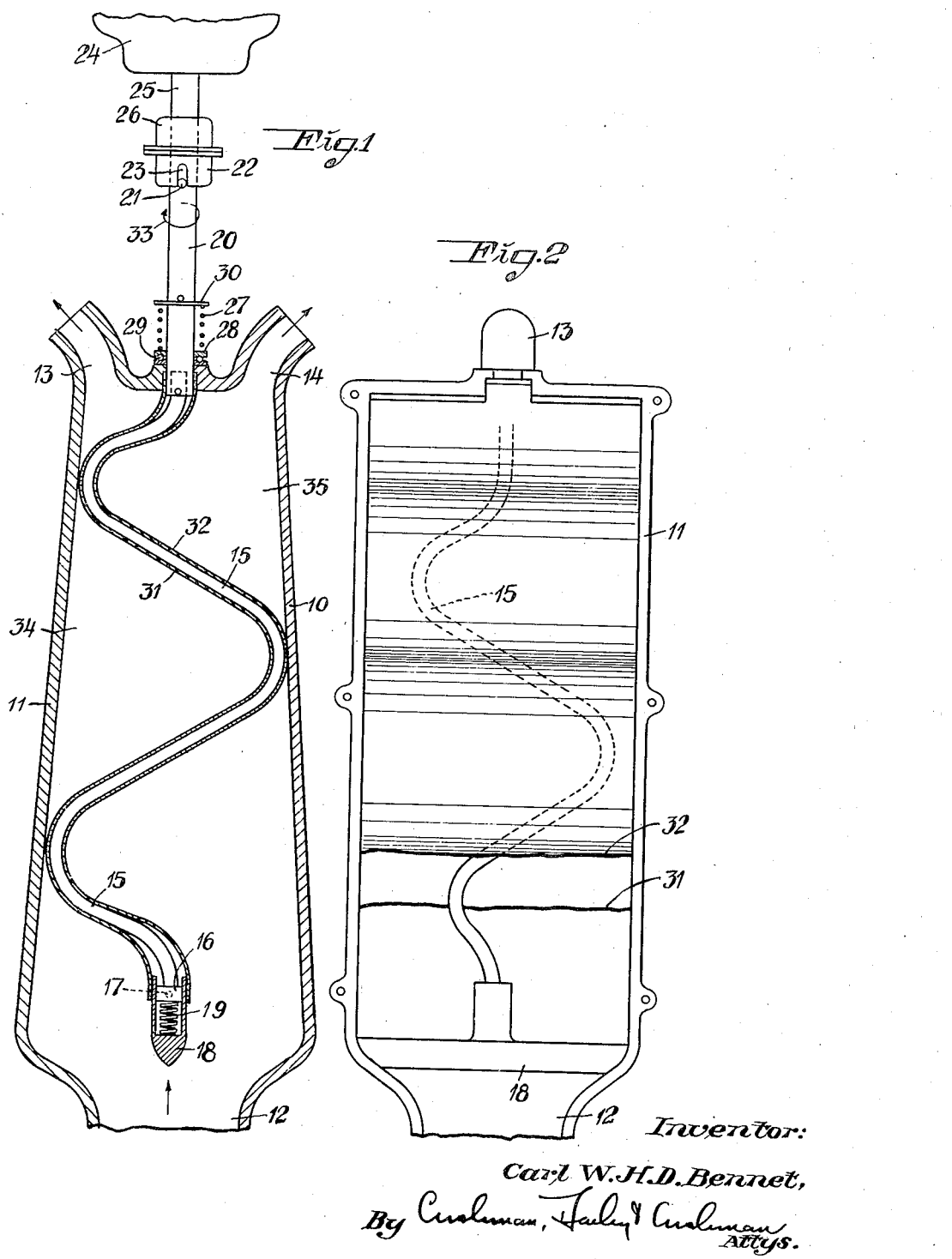

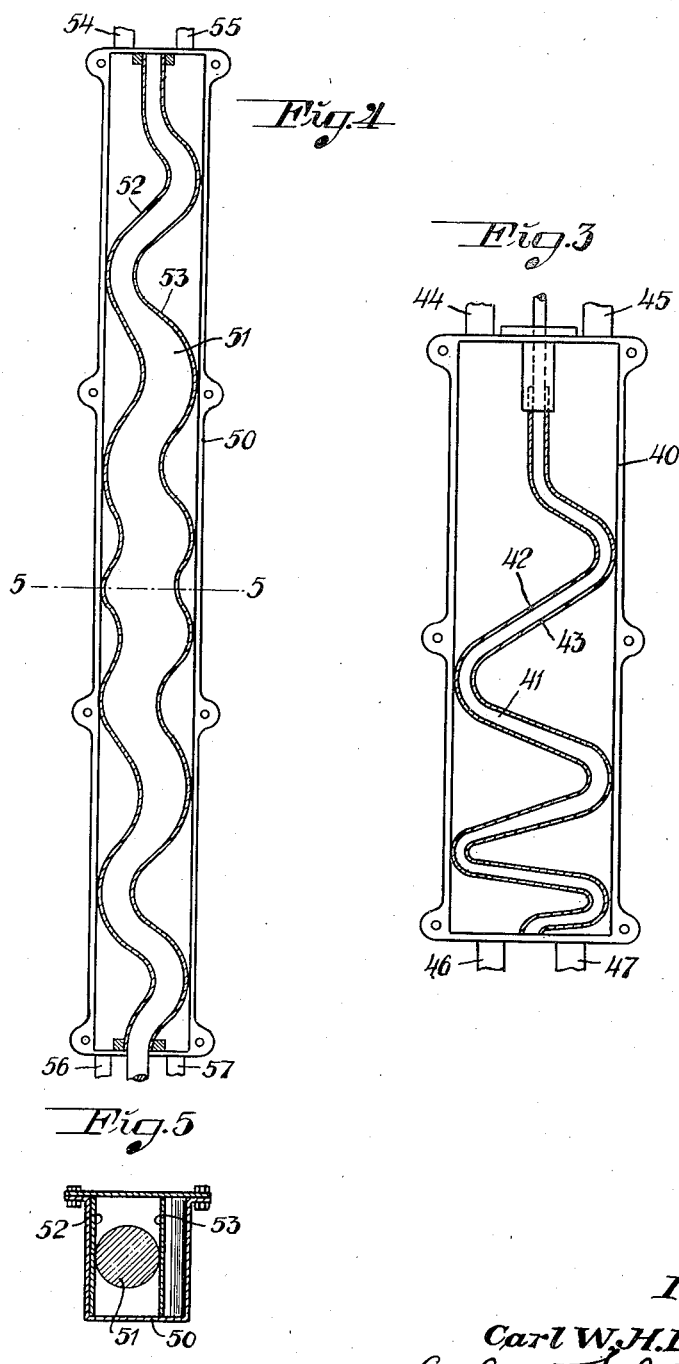

Patented May 13, 1941

2,241,975

UNITED STATES PATENT OFFICE 2,241,975

ELASTIC FLUID ENGINE

Carl Wilhelm Henrik Dücker Bennet, Stockholm, Sweden, assignor to Louise Gunnila Violet Bennet, Runeborg Stocksund, Sweden Original application June 20, 1939, Serial No. 280,193. Divided and this application April 26, 1940, Serial No. 331,865. In Germany July 2, 1938

8 Claims. (Cl. 103—149)

This application is a division of my copending patent application Ser. No. 280,193, filed June 20, 1939, and, as to all subject matter, relates back to said application Ser. No. 280,193, and to foreign applications corresponding thereto for all dates and rights incident to the filing thereof.

The present invention relates to elastic fluid engines and has for its general object the provision of a simple and inexpensive elastic fluid motor or compressor which has but few working parts and is durable and reliable in operation.

I accomplish this object by means shown in the accompanying drawings, in which:

Fig. 1 is a central section of a first embodiment of the invention;

Fig. 2 is a side elevation of the casing and appertaining parts as viewed from the right in Fig. 1, some parts being broken away and one part of the casing being omitted;

Fig. 3 is a diagrammatic view of a second embodiment;

Fig. 4 is a diagrammatic view of a third embodiment; and

Fig. 5 is a section taken on the line 5—5 of Fig. 4.

My invention relates to that type of fluid engines in which one or more working spaces are confined by a casing and a flexible member arranged to perform a uni-directional wave-like movement. The said flexible member may be constituted by a uniform flexible band or by a flexible structure of the type described in the said application Ser. No. 280,193.

Referring to Figs. 1 and 2, I have shown an elastic fluid engine which may be operated either as a motor or as a compressor. The engine comprises a casing of rectangular cross-section consisting of two parts 10 and 11 suitably secured to each other, as by bolts or the like, so as to form a closed container having an inlet 12 and outlets 13 and 14. As will be seen from the drawing, two opposite walls of the casing are parallel to each other, whereas the other walls are convergent towards the outlets 13 and 14. The cross-sectional area of the casing is consequently gradually reduced from the inlet end towards the outlet end.

Mounted for rotation in the casing is a rod 15 in the form of a conically shaped helix the circumferential portions of which are located at constant distances from the convergent walls of the casing. For the sake of convenience the rod 15 is hereinafter termed the helix. The lower end of the helix is mounted in a member 16, such as by means of a ball 17. The member 16 is slidable in a cross bar 18 secured to the part 11 of the casing and is acted on by a helical spring 19. The upper end of the helix 15 is secured to a shaft portion 20 which by means of a cross pin 21 is driven by the part 22 of a shaft coupling. Part 22 has an axial slot 23 forming a guide for the pin 21. 24 denotes a driving engine of any suitable type, 25 the shaft thereof, and 26 the other part of the shaft coupling secured to the shaft 25. Reference numeral 27 denotes a helical spring surrounding the shaft portion 20 and inserted between a ring 28 connected to the casing by means of a ball bearing 29 and a collar 30 connected with the shaft portion 20.

On each side of the helix 15 there is provided a flexible band 31 and 32, respectively. At their ends the bands are fixed to the casing. The length of each band is such that the band follows the outline of the helix. The width of the band is equal to the distance between the inner sides of the parallel casing walls, and the thickness of the bands is such that they are in contact with the apices of the helix and with the inner sides of the convergent casing walls.

If the helix 15 be assumed to be a right-handed helix and rotating in the direction indicated by the arrow 33, a uni-directional wave-like movement will be imparted to the bands, and the working chambers 34, 35 will be displaced from the inlet 12 to the outlets 13 and 14, respectively, so that the elastic fluid on its passage from the inlet to the outlet will be compressed to a degree depending upon the degree of reduction of the cross-sectional area of the casing from the inlet end to the outlet end.

The springs 19 and 27 have for their purpose automatically to secure an efficient seal between the bands and the convergent walls of the casing. It is obviously not necessary to provide both spring members 19 and 27, and they have been illustrated only to show some examples for adjusting the helix.

In the embodiment diagrammatically shown in Fig. 3, the casing 40 has a constant cross-sectional area, whereas the pitch of the helix 41 increases gradually from one end of the casing to the other one. The amplitude of the helix is, however, constant throughout the whole length thereof. The flexible bands are indicated at 42 and 43. If the apparatus shown is to be operated as a compressor, the fluid to be compressed is supplied on that end where the pitch of the helix has its greatest value, that is through the conduits 44 and 45, and is discharged through the conduits 46 and 47. In this embodiment, the ratio of compression depends upon the degree of reduction of the pitch of the helix.

The embodiments described can be operated as motors for an expansible fluid, such as steam. In this case, fluid is admitted through the conduits 13 and 14 in the embodiment shown in Fig. 1, and through the conduits 46 and 47 in the embodiment according to Fig. 3, and exerts pressure on the bands whereby the helix is rotated and power can be derived therefrom.

In the embodiment shown in Figs. 4 and 5, working spaces gradually changing in volume from one end to the other end of the casing are obtained with a casing 50 of constant cross-sectional area and by means of a helically shaped rod 51 the diameter of which is gradually varied, whereby also the amplitude of the bands 52 and 53 is gradually varied.

By constructing the apparatus in such a manner that the volume of the working spaces is first gradually decreased from one end of the casing to about the centre thereof and thereupon is gradually increased towards the other end of the casing, an engine is obtained which, for instance, is adapted to work as an internal combustion engine in which fluid is compressed and then ignited at the place where the volume of the working space is a minimum, and thereupon expanded. This may be accomplished by the embodiment shown in Figs. 4 and 5 in which fluid is compressed between the inlets 54, 55 and the middle portion of the apparatus and expanded between said portion and the outlets 56, 57. One half of the apparatus thus operates as a compressor and the other half as a motor for expansible fluid.

While in the foregoing description I have confined my consideration to engines having a flexible member each on either side of the helix, it will be understood that the invention is not limited to this specific arrangement but may equally well be embodied by an apparatus having one elastic member only or by an apparatus embodying a combination of the novel features described with reference to the drawings.

What I claim is:

1. An elastic fluid engine comprising a casing having fluid inlet and outlet openings, a flexible member in said casing arranged to perform a uni-directional wave-like movement, a working chamber confined by said casing and said member and arranged upon movement of said member to be displaced longitudinally of said casing, and a movable part in power transmitting relationship to said member, the volume of said working chamber being gradually reduced at least throughout part of the length of said casing.

2. An elastic fluid engine comprising a casing of gradually reduced cross-sectional area, said casing having fluid inlet and outlet openings, a flexible member in said casing arranged to perform a uni-directional wave-like movement, a working chamber confined by said casing and said member and arranged upon movement of said member to be displaced longitudinally of said casing, and a rod for cooperation with said member, said rod extending in the longitudinal direction of said casing and being in the form of a conical helix rotatable about its longitudinal axis.

3. An elastic fluid engine comprising a casing of gradually reduced cross-sectional area, said casing having fluid inlet and outlet openings, a flexible member in said casing arranged to perform a uni-directional wave-like movement, a working chamber confined by said casing and said member and arranged upon movement of said member to be displaced longitudinally of said casing, a rod for cooperation with said member, said rod extending in the longitudinal direction of said casing and being in the form of a conical helix rotatable about its longitudinal axis, and resilient means for forcing said rod toward the tapered end of said casing.

4. An elastic fluid engine comprising a casing of constant cross-sectional area, said casing having fluid inlet and outlet openings, a flexible member in said casing arranged to perform a uni-directional wave-like movement, a working chamber confined by said casing and said member and arranged upon movement of said member to be displaced longitudinally of said casing, and a rod for cooperation with said member, said rod extending in the longitudinal direction of said casing and being in the form of a helix of gradually diminishing pitch and rotatable about its longitudinal axis.

5. An elastic fluid engine comprising a casing having fluid inlet and outlet openings, a flexible member in said casing arranged to perform a uni-directional wave-like movement, and a rod for cooperation with said member, said rod extending in the longitudinal direction of said casing and being in the form of a helix being rotatable about its longitudinal axis, the diameter of said rod being gradually increased at least throughout part of its length.

6. An elastic fluid engine comprising a casing having fluid inlet and outlet openings, a flexible member in said casing arranged to perform a uni-directional wave-like movement, a working chamber confined by said casing and said member and arranged upon movement of said member to be displaced longitudinally of said casing, and a movable part in power transmitting relationship to said member, the volume of said working chamber being first gradually reduced and then gradually increased in the longitudinal direction of said casing.

7. An elastic fluid engine comprising a casing having fluid inlet and outlet openings, a flexible member in said casing arranged to perform a uni-directional wave-like movement, and a rod for cooperation with said member, said rod extending in the longitudinal direction of said casing and being in the form of a helix being rotatable about its longitudinal axis, the diameter of said rod being first gradually increased and then gradually reduced.

8. An elastic fluid engine comprising a casing having fluid inlet and outlet openings, two flexible members in said casing arranged to perform uni-directional wave-like movements, a first working chamber confined by said casing and one of said members, a second working chamber confined by said casing and the other one of said members, said working chambers being arranged upon movement of said members to be displaced longitudinally of said casing, and a helically shaped rod disposed between said members in power transmitting relationship thereto, the volumes of said working chambers being gradually reduced at least throughout part of the length of said casing.

CARL WILHELM HENRIK DÜCKER
BENNET.